J. S. BRAND & F. A. JOHNSON.
TYPE CASTING AND COMPOSING MACHINE.
APPLICATION FILED MAY 2, 1910.

1,174,049.

Patented Mar. 7, 1916.
11 SHEETS—SHEET 1.

Witnesses
M. C. Crane
T. O. MacKinnon

Inventors
John S. Brand,
F. Amos Johnson,
By F. Amos Johnson
Atty

J. S. BRAND & F. A. JOHNSON.
TYPE CASTING AND COMPOSING MACHINE.
APPLICATION FILED MAY 2, 1910.

1,174,049.

Patented Mar. 7, 1916.
11 SHEETS—SHEET 2.

Witnesses
M. C. Crane
T. O. MacKinnon

Inventors,
John S. Brand,
F. Amos Johnson
By F. Amos Johnson
Atty

J. S. BRAND & F. A. JOHNSON.
TYPE CASTING AND COMPOSING MACHINE.
APPLICATION FILED MAY 2, 1910.

1,174,049.

Patented Mar. 7, 1916.
11 SHEETS—SHEET 3.

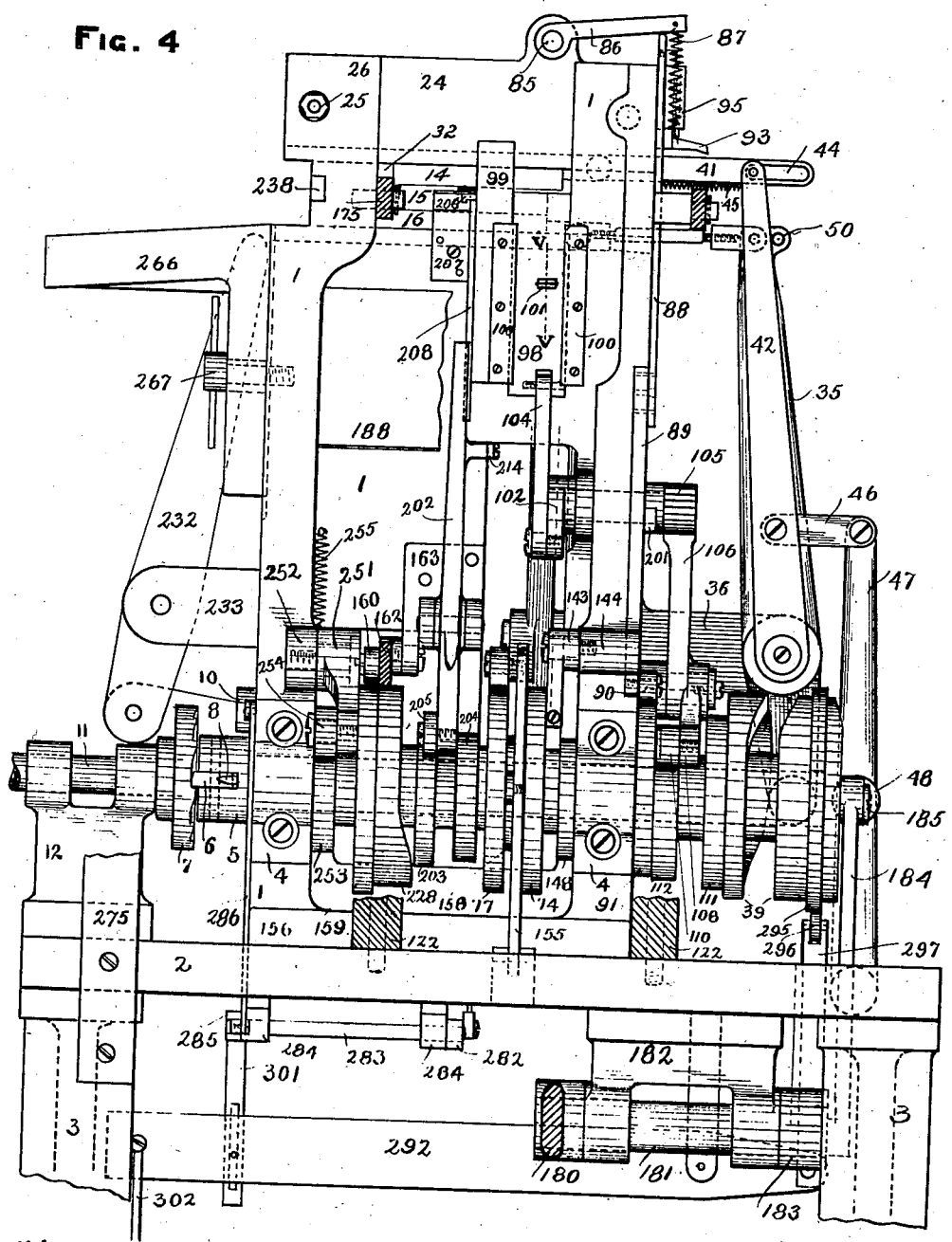

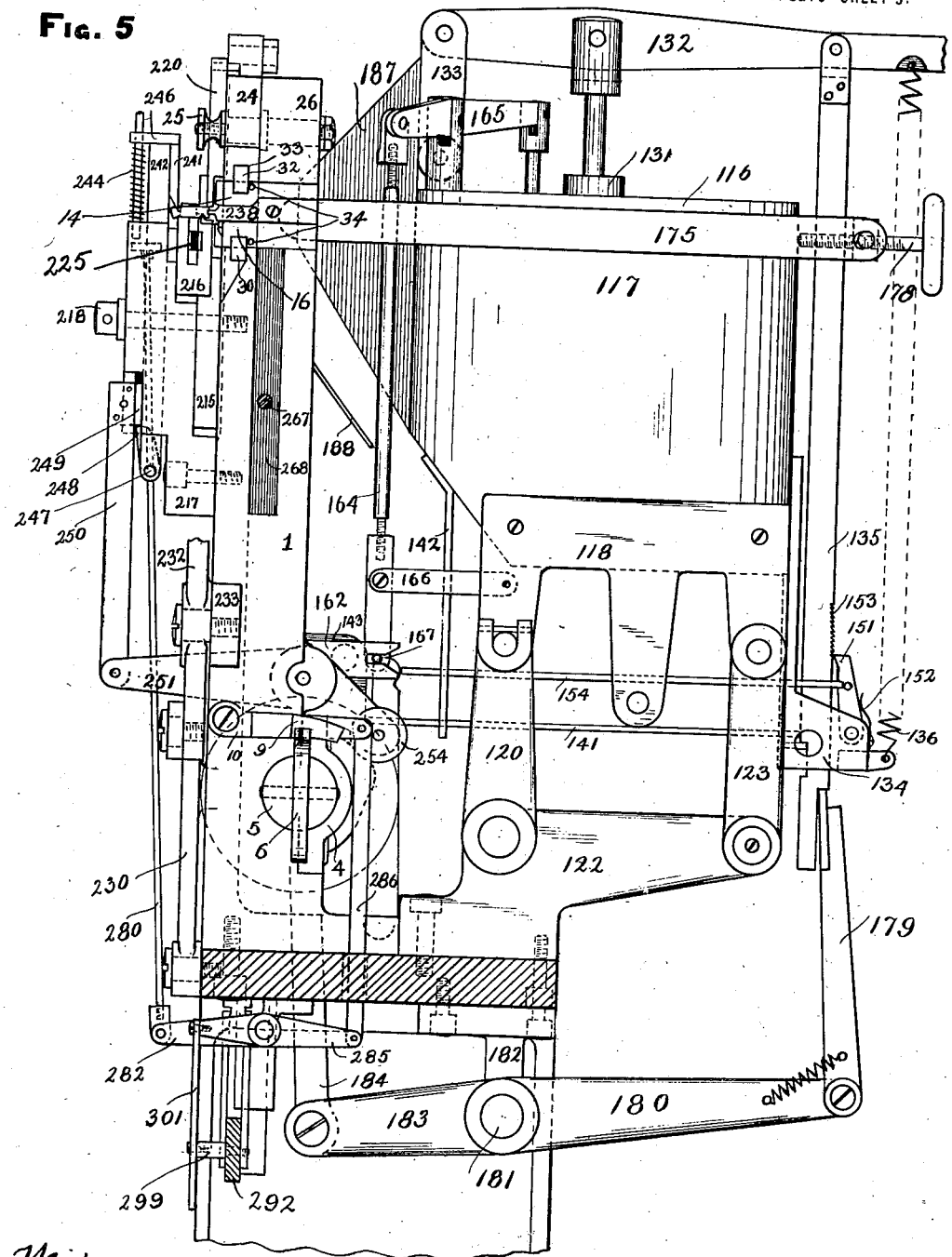

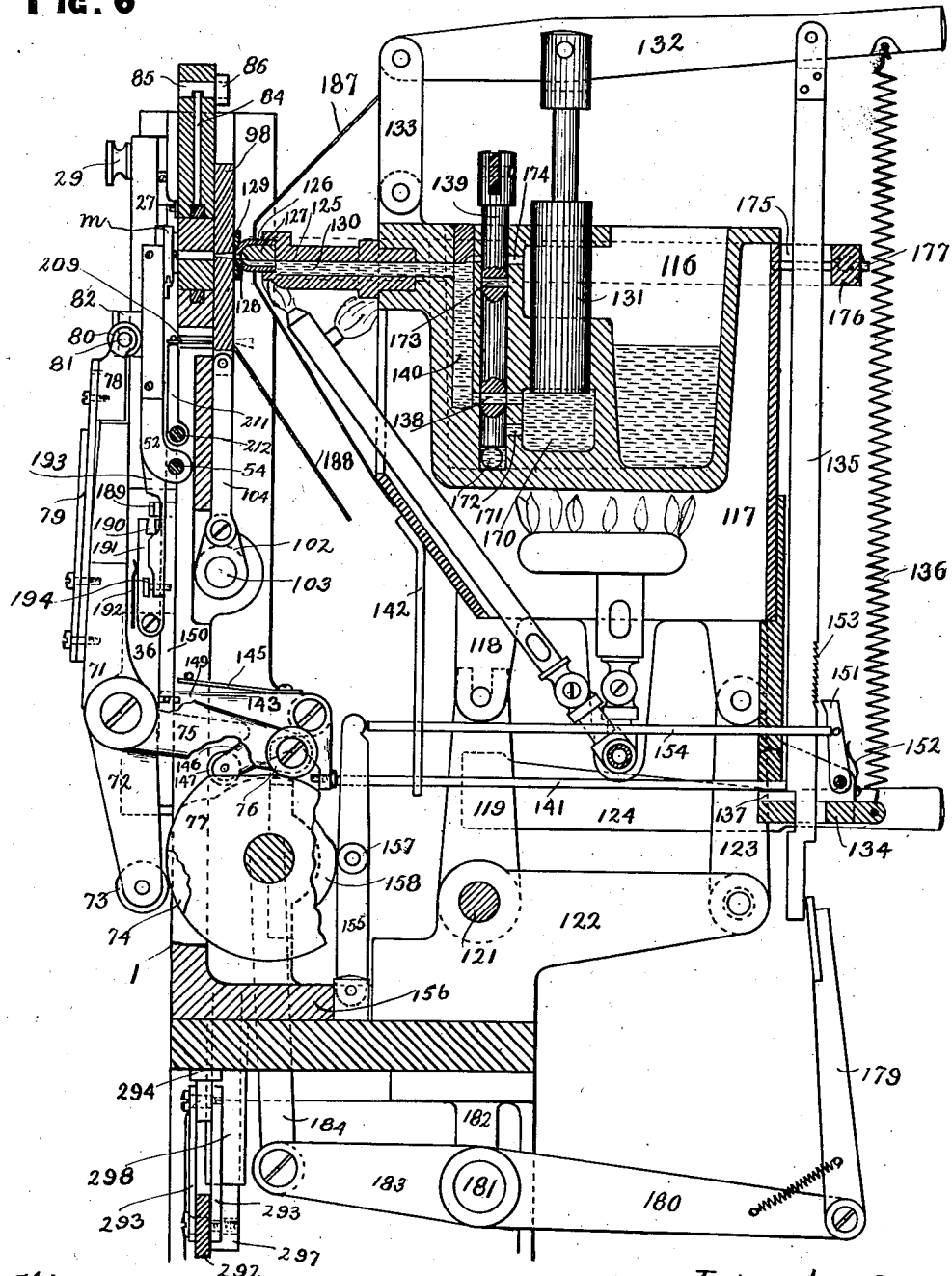

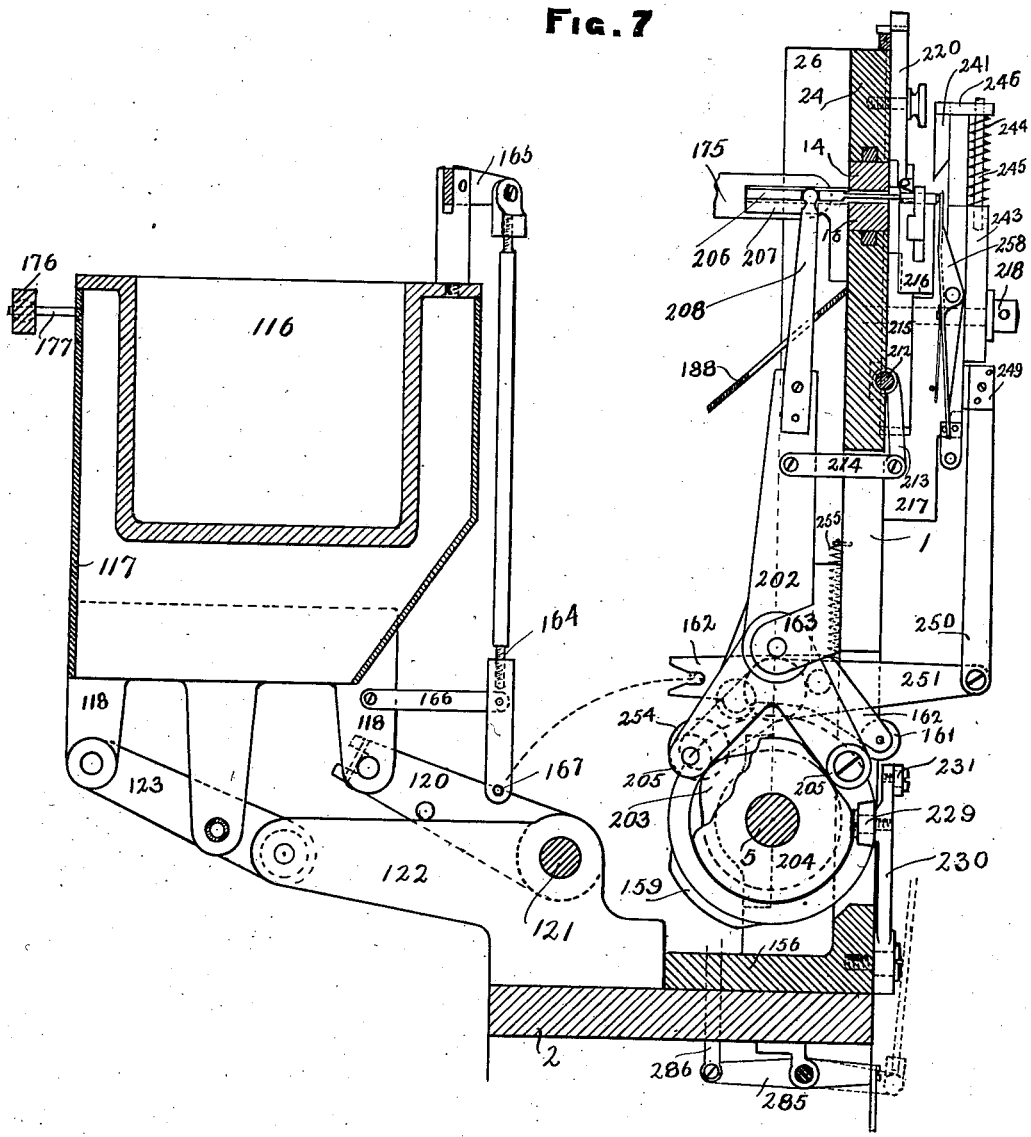

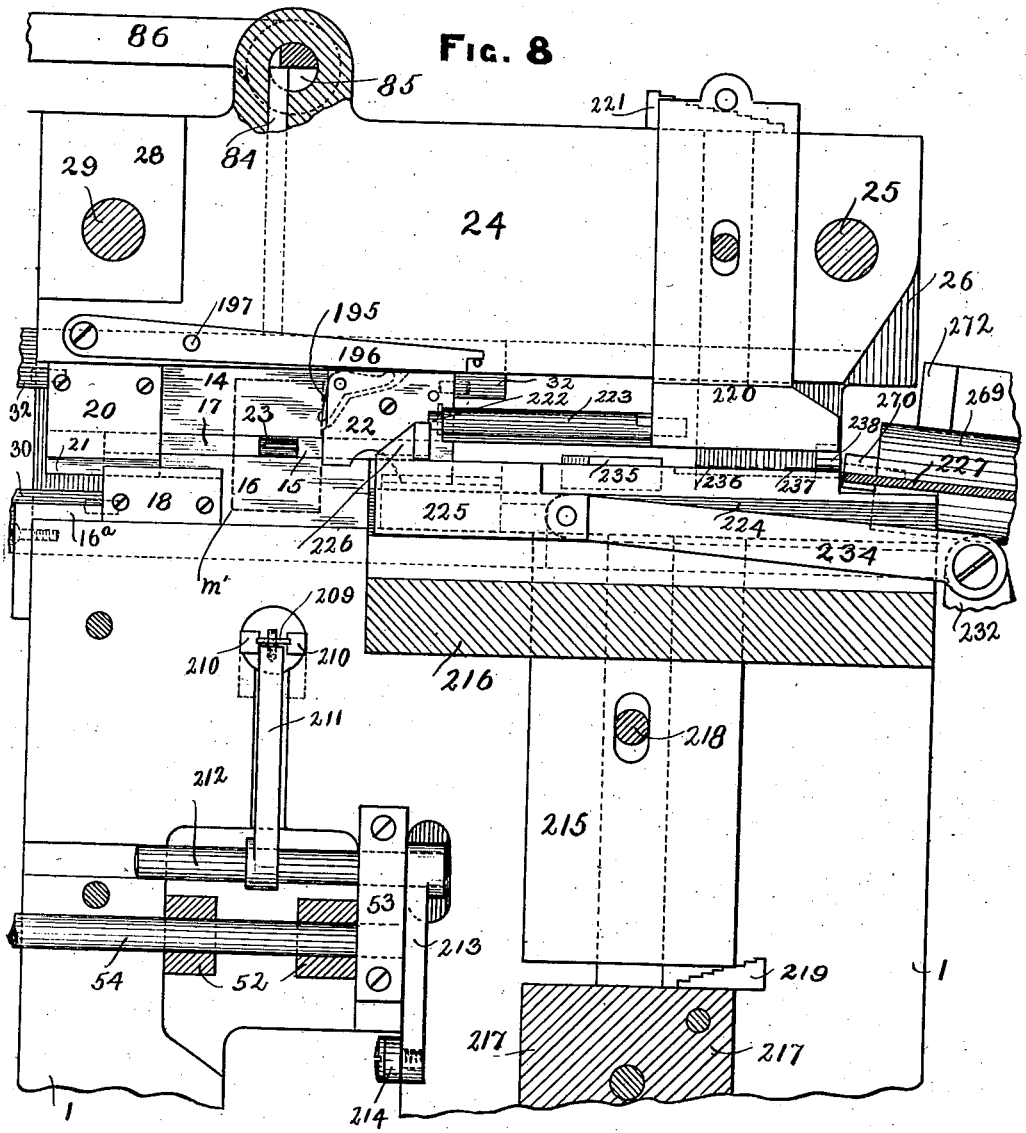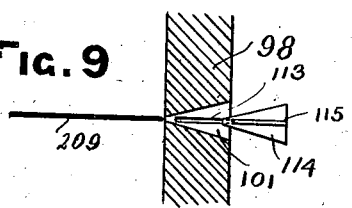

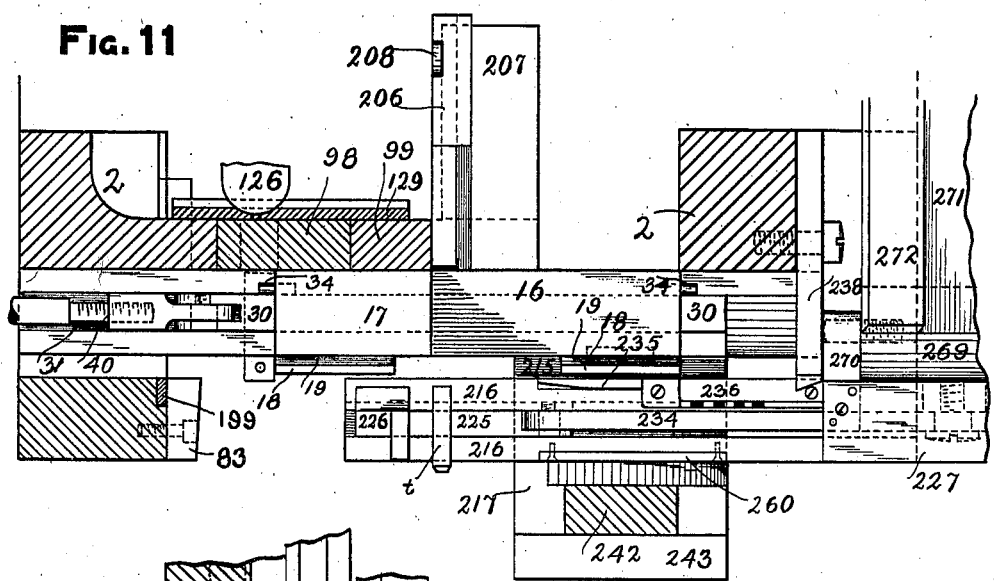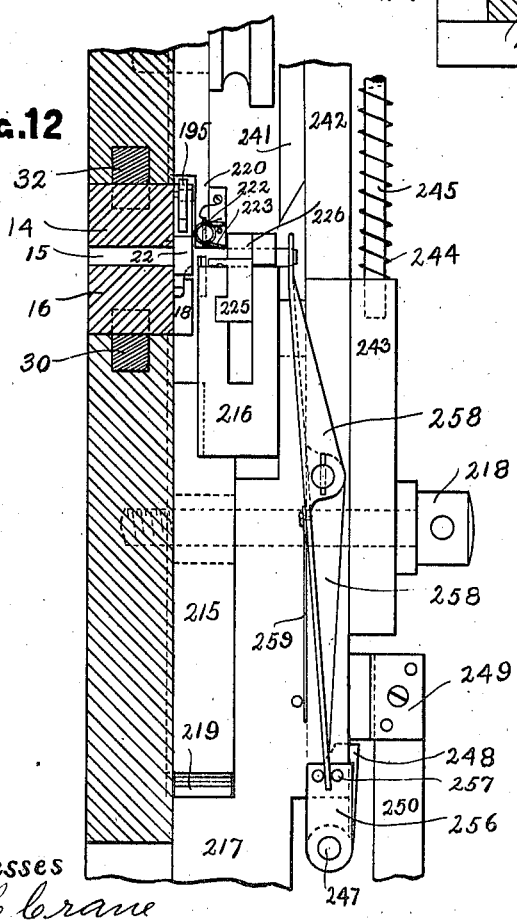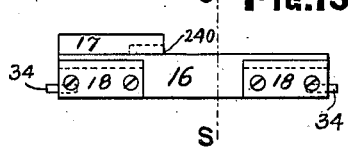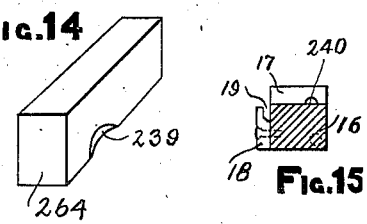

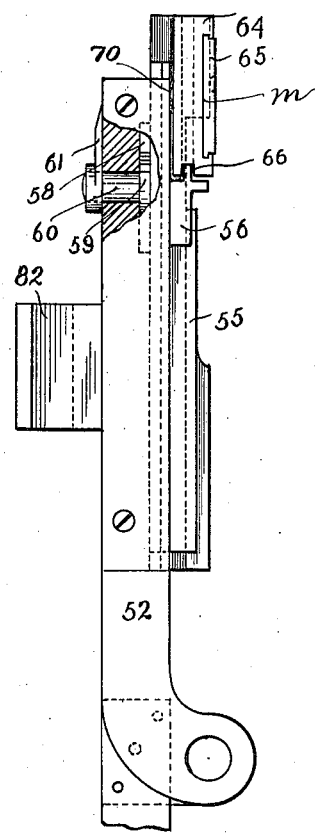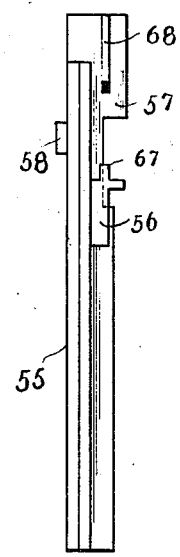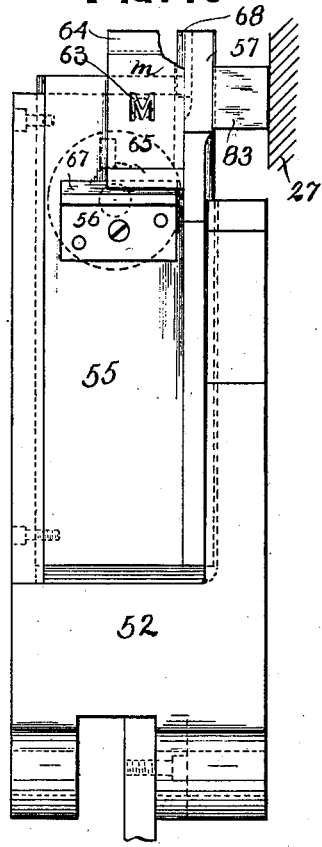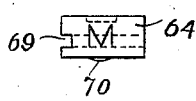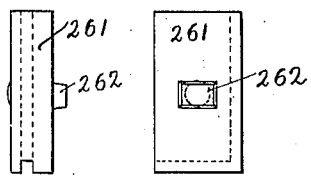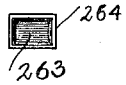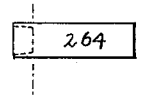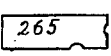

J. S. BRAND & F. A. JOHNSON.
TYPE CASTING AND COMPOSING MACHINE.
APPLICATION FILED MAY 2, 1910.

1,174,049.

Patented Mar. 7, 1916.
11 SHEETS—SHEET 11.

Witnesses
Peter C. Gerken
J. D. [illegible]

Inventors,
John S. Brand
F. Amos Johnson
By F. Amos Johnson atty

UNITED STATES PATENT OFFICE.

JOHN S. BRAND, OF FAIRHAVEN, MASSACHUSETTS, AND FRANK AMOS JOHNSON, OF JERSEY CITY, NEW JERSEY.

TYPE CASTING AND COMPOSING MACHINE.

1,174,049. Specification of Letters Patent. Patented Mar. 7, 1916.

Application filed May 2, 1910. Serial No. 558,799.

*To all whom it may concern:*

Be it known that we, JOHN S. BRAND, a citizen of the United States, and a resident of Fairhaven, Massachusetts, and FRANK AMOS JOHNSON, a citizen of the United States, and a resident of Jersey City, New Jersey, have invented certain new and useful Improvements in Type Casting and Composing Machines, of which the following is a specification.

Our invention relates to type-casting and composing machines—especially to a machine for casting job and display type in the order of composition and assembling the lines in a galley. The machine may, however, be used as a simple type-casting machine, to cast type for the case.

At the present time most jobs requiring display type are set from the case by hand—the type being purchased from type founders, or cast on a machine and distributed into the case by the printer. It has been our aim to produce a cheap and efficient casting machine, which can be operated by any person of ordinary intelligence and one which will do in job and display work, what several forms of composing machines now do in straight composition.

The particular features of our invention will be pointed out in the following specification and more particularly defined in the claims, reference being made to the accompanying drawings, in which—

Figure 1:
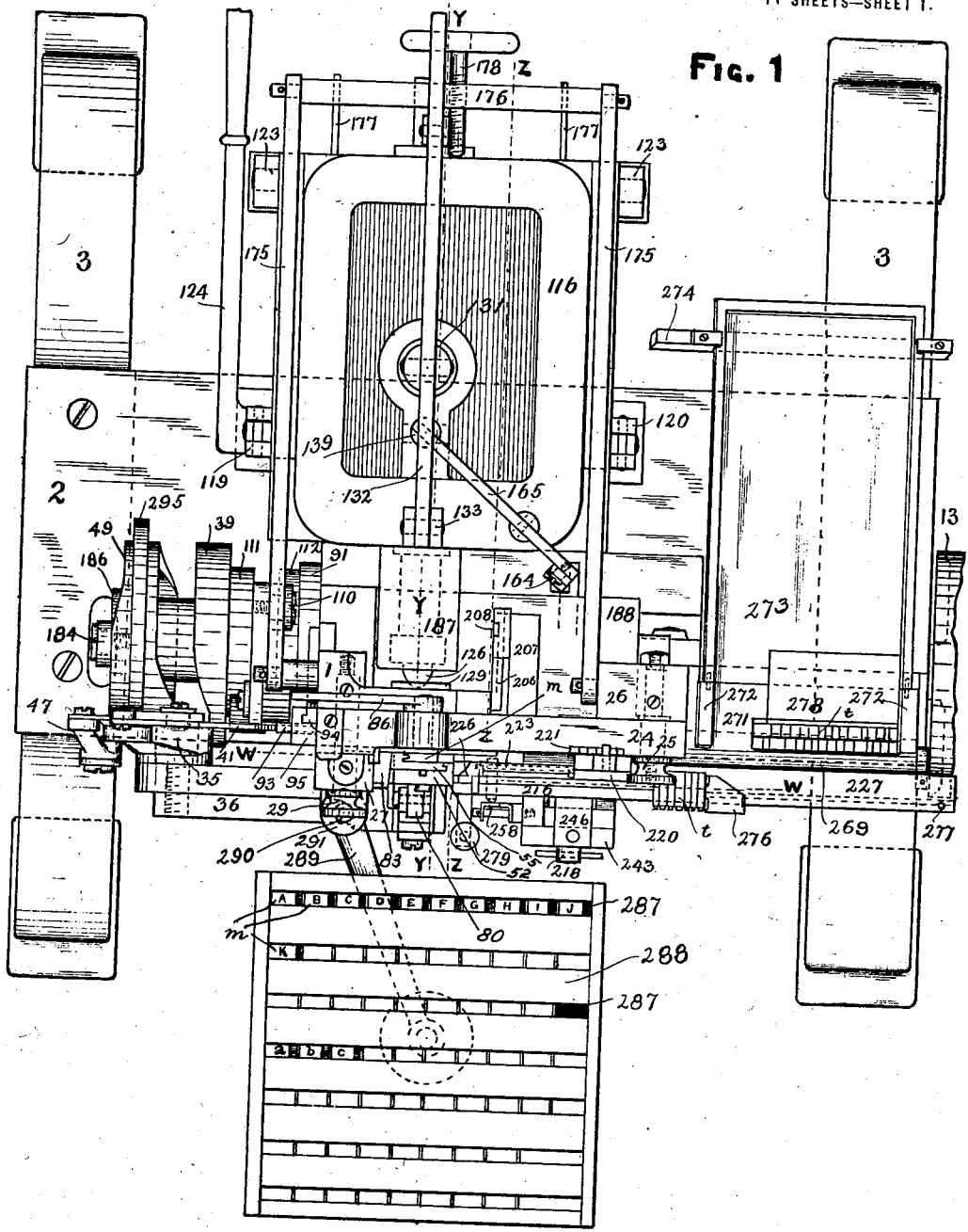
Figure 2:
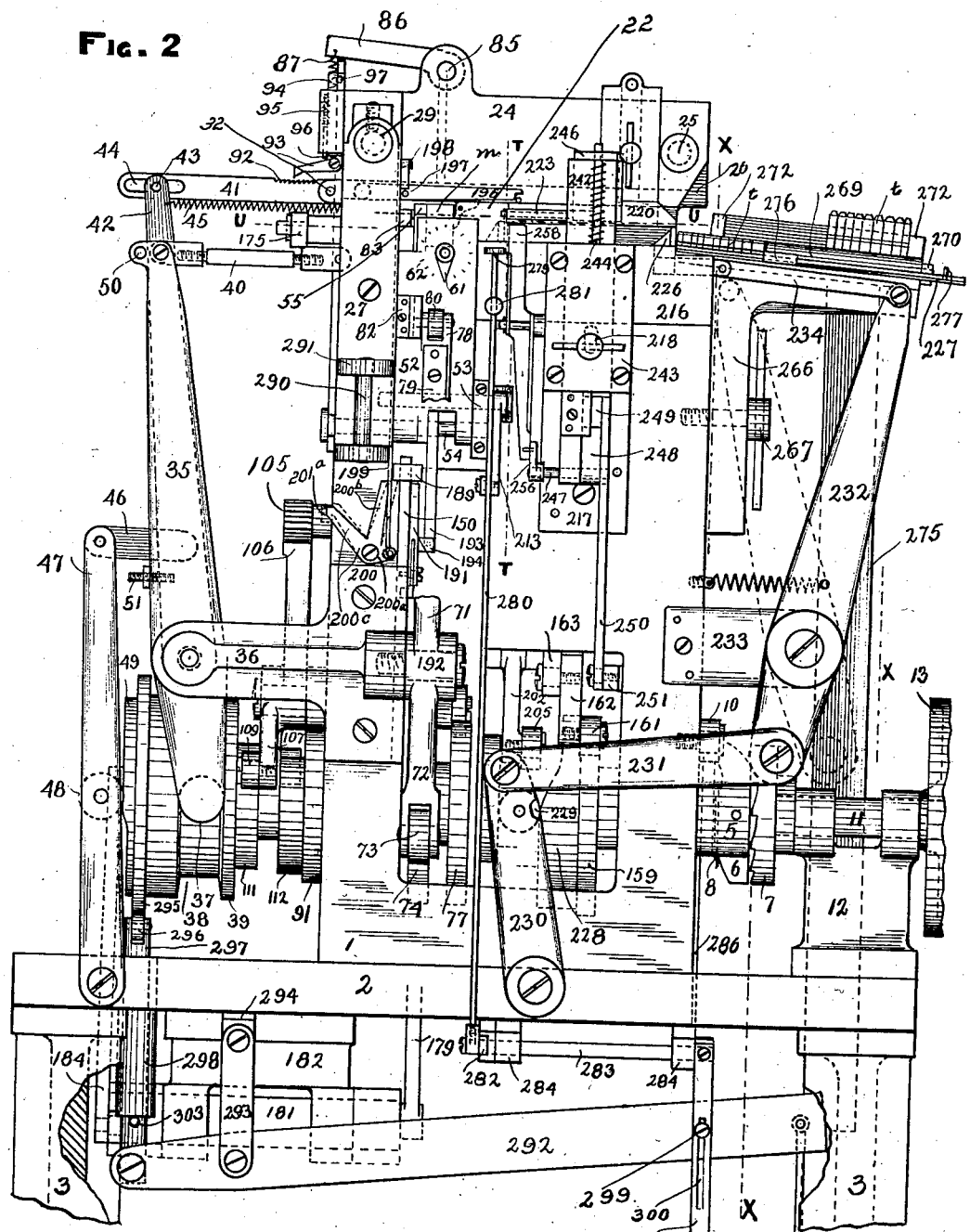
Figure 3:
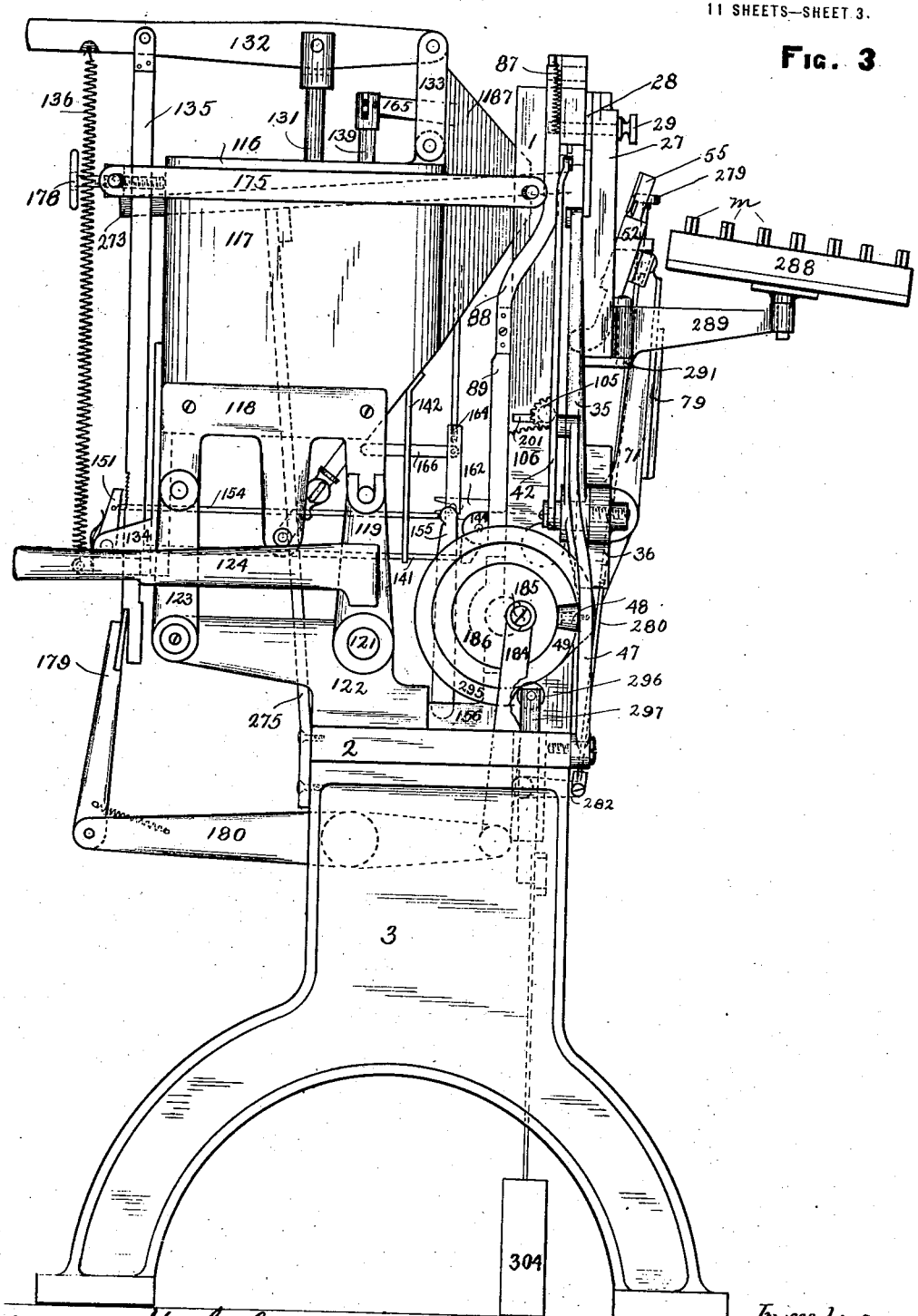
Figure 26:
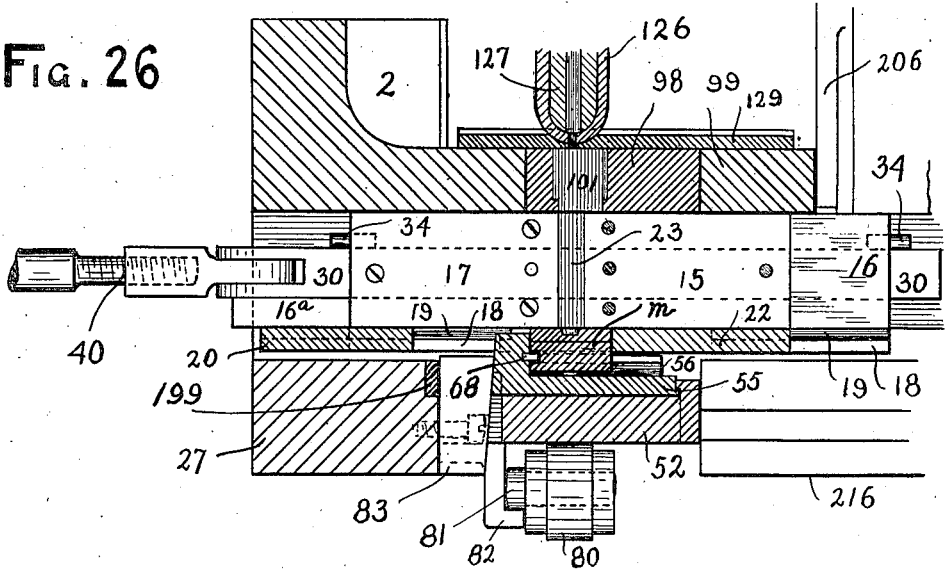
Figure 27:
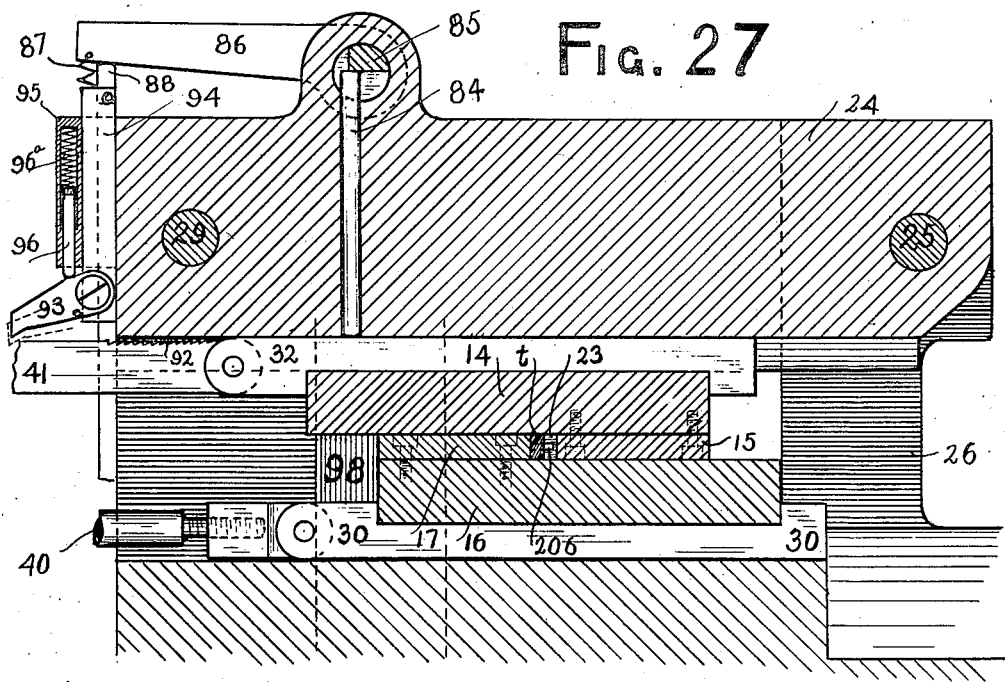

Figure 1 is a plan; Fig. 2 is a front elevation, only a portion of the legs being shown; Fig. 3 is a full left elevation; Fig. 4 is a rear elevation, with the metal pot and galley removed; Fig. 5 is a right sectional elevation, about on line X—X—X of Fig. 2; Fig. 6 is a right sectional elevation, about on line Y—Y—Y of Fig. 1; Fig. 7 is a partial left sectional elevation about on line Z—Z of Fig. 1; Fig. 8 is a partial front sectional elevation about on line W—W of Fig. 1; Fig. 9 is a section through the jet chamber, on line V—V of Fig. 4; Fig. 10 is a perspective view of a jet; Fig. 11 is a horizontal section, about on line U—U of Fig. 2; Fig. 12 is a left sectional elevation, about on line T—T of Fig. 2; Fig. 13 is a front elevation of the lower half of a type mold; Fig. 14 is a perspective of a space; Fig. 15 is a section of a portion of the mold, on line S—S of Fig. 13; Fig. 16 is a side elevation of a finished type; Fig. 17 is a right elevation of the matrix carrier or platen, complete with alining slide and matrix; Fig. 18 is a right elevation of the matrix alining slide; Fig. 19 is a rear elevation of the matrix platen complete with alining slide and matrix; Fig. 20 is a top view or plan of a matrix; Figs. 21 and 22 are side and rear elevations respectively of a space matrix; Fig. 23 is a front elevation of a space, as cast from one of the special space matrices; Fig. 24 is a side elevation of the same; Fig. 25 is a side elevation of a completed space—it having been cut off on line R—R of Fig. 24. Fig. 26 is a horizontal section through the mold, about on line with the upper edges of the body pieces 15 and 17, of Fig. 8. Fig. 27 is a vertical longitudinal section about central with the cap plate 24 and mold, as shown in Fig. 8.

*General description.*

The mold is quite similar in shape to those of the old-style type casters, which were in almost universal use before the advent of the perfecting machine and consist of two similar, obverse portions or halves. That is, there are top and bottom cheek pieces, between which are two pieces which determine the body of the type and form the side walls of the mold—one being fastened to the upper cheek piece and one to the lower. Instead of swinging apart, as in the old-style machine referred to, the two portions of the mold are adjusted longitudinally, one part on the other, to vary the mold opening, and the mold reciprocates in a mold runway, which allows it just a running clearance. There are no nick-forming ribs in the mold and the two parts are held in register by tongue-and-groove plates on the face of the mold. This construction permits the type which are cast being pushed out of the mold by an ejecting plunger. The mold has a reciprocating movement from left to right—a type being cast when the mold is at the left and ejected when it is at the right. The lower cheek piece, which carries the left hand portion of the body piece, comes back to a fixed position every time a type is cast—a suitable stop being provided for it to come up to. The upper cheek piece or portion of the mold carries a bumper plate, which is adapted to strike against a matrix block and limit it in its movement. After the lower portion of the mold is brought to casting position a matrix is brought up against it, but with no perceptible pressure on it; the upper portion is then moved, yieldingly, until the bumper plate strikes the matrix to limit the mold opening to the proper size for that particular character—the matrix blocks which carry the matrices varying in width according to the running widths of the letters. The matrix is then pressed firmly against the mold; the two portions of the mold clamped together and a type cast. The matrix is then withdrawn; the mold unclamped and carried to the right, where the type is ejected toward the front, onto suitable ways—to be carried farther to the right and assembled in a line, after being suitably nicked and having a foot planed in it.

In the old-style casters referred to, there was a jet chamber, formed by parts which were attached to the upper and lower portions of the mold. We provide a separate integral slide, which has a jet-forming chamber. This slide moves at right angles to the mold movement—i. e., it has a vertically reciprocating movement, while the mold moves horizontally. The downward movement of the jet slide precedes the movement of the mold to the right, thereby cutting off the jet; and as the type is ejected from the mold a second finger, which is operated by the same cam, ejects the jet from the jet chamber. This construction is very advantageous, as one jet slide serves for all body sizes which can be cast on the machine. In changing from one body size to another all that has to be changed is the two portions of the mold proper, which are exact duplicates of each other, except the front plates and, being of very simple construction, can be cheaply made. The molds are the most expensive part of a type-casting machine and this construction enables us to furnish a machine with a wide range of body sizes, at comparatively small cost.

In all type casting and composing machines with which we are familiar, there is a matrix- or die-case and a key-board mechanism; or a complete set of matrices attached to or controlled by a bank of keys and connections therefrom. We greatly simplify the construction by dispensing with the die-case as ordinarily understood and all key-board mechanism. We use a set of separate, disconnected matrices, which are arranged in separate compartments of a tray—one six or seven inches square being large enough to contain all the characters of a font of type. These matrices are sufficiently large to be easily picked up and handled, and they have the characters plainly marked on their upper ends.

In front of the mold there is a reciprocating matrix carrier, which is quite similar to the platen of an ordinary job printing press. This platen is adapted to receive a matrix, carry it up to the mold, hold it there long enough to cast a type, and return with it to the starting point. The matrix is not gripped in any way and can be picked up from the platen without having to release it in any way. The tray of matrices is mounted on a suitable bracket which extends forward from the machine and is in close proximity to the matrix platen. The operator picks up the matrix he wants, places it on the matrix platen and touches a starting key, which is arranged in a convenient position. This calls into action a cam shaft and causes it to make one revolution and stop—the one revolution of the shaft controlling the complete cycle of operations which are necessary to cast and eject a type. The stopping point of the shaft is, however, in the middle of the cycle of operations: i. e., as the first matrix is placed on the platen and the starting key is struck, the machine goes through the motions of ejecting a previously cast type before the mold is brought into position to cast a type from the matrix which has just been inserted. The matrix platen holds the matrix against the mold long enough for the face of the type to solidify and then it is withdrawn, so that another matrix can be substituted; but the mold remains locked until the machine is again started. This gives the type time to cool, while the matrices are being changed, which is necessary, in casting large sizes of type, in order to prevent "swelled bodies". A water-jacketed mold is used, but as there is nothing novel in such a device, it is not shown in the drawings.

The whole operation is very similar to feeding cards to a job press—the matrix just used being removed by the left hand and returned to its compartment, just as a card would be removed and the next succeeding matrix is inserted with the right hand, just as a card would be placed on the gage pins. The stops on the platen, which correspond to the gage pins of a job press, are tongued and the matrices are grooved on the bottom and left hand sides to match these tongues. This arrangement strips the matrix from the cast type just as the gripper fingers of a job press withdraw the printed card from the form. Both the bottom and side gages are mounted on an independent slide which is carried in the face of the platen. This slide moves up and down. The side gage is, therefore, constant for all matrices. The slide is shifted to change the register of the matrix on the mold—a stepped piece being interposed between the platen and the slide and a suitable pointer and scale is provided which indicates the exact position of the slide. This arrangement permits the alinement of the type to be changed at will. A 6-point letter can be placed in any position on a 36-point body, for instance.

The advantage of having different size faces cast on one body is so great that the type foundries now furnish, in faces frequently used, three and sometimes four different sizes on one body. To make such a system universal would require so many different cases and so much type that it would be prohibitive for the ordinary printer. Our machine enables the printer to have all these advantages without any additional cost. Not a single type need be cast that is not to be used on a given job.

Instead of having to put leads at the top and bottom of a small body size of type in order to make it line with a larger size, the operator simply shifts the register slide on the matrix platen and the small size face is cast on the large size body in any desired position, giving the possibility of an almost infinite number of combinations.

In the die-case and key-board type of machine the number of characters is limited, unless the die-case is made unwieldly—except by a change of the die-case—an operation which takes time. In our machine, one tray may be substituted almost instantly and, the matrices being independent and disconnected, they may be selected from other trays, within the convenient reach of the operator. This increases the capacity of our machine from two or three hundred characters—about the limit of the die-case type of machine—to as many thousands and that, too, without complicating the mechanism or increasing the cost other than the actual cost of the matrices themselves.

While our machine is intended to be used as a type-casting and composing machine, it is equally well adapted as a type casting machine—to cast one letter at a time to be distributed into a case and set up by hand. This requires the addition of a starting device for the larger sizes. In casting small sizes—those which will cool during one cycle of the cam shaft without stopping—nothing is necessary except to place the matrix of the character desired on the platen and hang a weight on the starting key, or lock it down in any other manner. In casting larger sizes, we provide an automatic starting device. The cam shaft stops each time a type is cast and, as soon as sufficient time has elapsed for the large type to cool, the starting device trips the clutch and starts the shaft off again. This device consists of a weighted lever, which is raised by the cam shaft and released just as the shaft reaches its stopped position. As the weighted lever falls it is adapted to operate the clutch the same as the starting key. The time consumed by the weighted lever in falling is controlled by a dash-pot and may be set to give the proper amount of time for the size of type that is being cast; so the maximum output of the machine is obtainable.

After the type are cast the mold is unclamped and carried to the right. If the type which has been cast is not wider than the ejecting finger, or if no type has been cast, the upper portion of the mold is moved a greater distance than the lower portion, in order to insure an opening for the ejecting finger which comes forward at this time to eject the type forward onto the type way and in front of a type hook—a light friction blade being provided for them to come under. The type hook carries the type to the right over a nick cutter and past a foot planer. This gives the type its two feet to stand on and makes a small nick, which is desirable in correcting proof. For ordinary purposes no other nicks are necessary and the molds are reduced in cost by dispensing with the nick-forming rib. Where the type are to be put into a case to be used over and over again, identifying nicks may be milled in them, on a separate machine and all the different faces which are cast on one body may be plainly distinguished—thus avoiding the annoyance which is now experienced in type obtained from the foundries, where they often cast several similar faces on one body with identical nick markings.

Shoulder-high spaces are produced by putting in a blank matrix block. Low spaces and quads are produced in a manner quite similar to that described in U. S. Patent 862,800, to W. E. Brand—*i. e.*, by cutting off the end of a shoulder-high space, on its passage from the mold to the point of assembly. Instead of using a saw, as in the Brand patent referred to, we use a chisel. This chisel is arranged along the typeway, between the point where the type come out of the mold and the line of assembly and its movement is controlled by a trigger device. When a type is ejected from the mold it strikes against a light trigger arm. Connections are made which render the chisel inoperative for that revolution of the shaft. The type stops under the chisel, on its way to the line, but the chisel does not move and it is not touched. When a shoulder-high space comes out of the mold it is too short to operate the trigger and as the type hook carries it to the right it stops under the chisel and the chisel, not having been thrown off, is drawn down and cuts off, say, one-eighth of an inch from the end of the space and makes it about the same height as a foundry low space. It is then carried on to the right into the line, the same as a type. Shoulder-high spaces are reduced, in this manner, without difficulty, in the smaller sizes of type and the chisel has an advantage over a saw, in that it is cheaper to make; easier to operate; and does not produce any fine dust. In the larger sizes of type we use a special matrix for casting the spaces, which make it easier for the chisel to cut off the end. These space matrices have lugs which are adapted to enter the mold chamber the distance which it is desired to shorten the space— say one-eighth of an inch. These lugs are, in cross section a little less than the cross section of the mold chamber. A space cast from such a matrix has a box-like end, with very thin walls, which is easily cut off by the chisel and there is no limit to the size body or width of space which may be made, so far as the cutting off the ends is concerned.

We are aware that low spaces have been cast by inserting a block which entirely fills the mold chamber to the depth to which it is desired to reduce the space. This method is objectionable in that, in moving in and out of the mold, it is bound to wear the walls of the mold chamber and hence, in time, impair the accuracy of the type cast in the mold. In our device, the matrix lug which is inserted, does not touch the walls of the mold chamber at any point. We depend on the chisel or other cutter to shorten the space—the block on the space matrix simply reduces the amount of material that has to be removed so that it comes easily within the capacity of the cutter which is used.

As the type are carried to the right they are assembled on a swinging line blade, against a receding friction slide which is carried by the blade. On the completion of a line it is pushed to the extreme right, by hand, and swung upward and backward and deposited in a galley. The blade will fall by gravity and the slide is moved to the left to receive the first type of the next succeeding line.

The metal pot, which contains the molten metal, has a piston, which is locked up under spring tension and released at the proper time in the sequence of operations, to inject metal to form a type—provided there is a matrix in place and provided it is properly seated on the mold. Otherwise, a safety device will prevent the pump from being released.

The nipple or snout is long and tubular in shape and the front end, or nipple proper, is of an improved construction, which gives a short abrupt turn to the passage of metal and permits the metal being kept right up to the outlet—a sliding valve acting, in one position, to allow the pump well to fill and the surplus metal to run back into the pot and, in another position, the overflow port and intake ports are closed and a port leading directly from the well to the mold chamber is opened. This enables us to eject the metal horizontally, without the use of a choker valve and with practically no air to expel from the metal passageway and permits of a proper action of the pump as long as there is any metal left in the pot.

The pump piston, in its downward stroke, cushions on the metal and it is locked against further downward movement before the valve is shifted. The pump, therefore, makes only so much of a stroke as is necessary in order to produce the type which is being cast.

The pot is mounted on swinging legs so that it may be easily moved backward and downward away from the rest of the machine.

The type mold is inclosed between a pair of mold-carrying yokes and can be easily separated, when the mold is free to be lifted out and another one substituted—the whole operation requiring but a few seconds.

Besides the mold clamping device for holding the two portions of the mold together there is a special locking device for preventing the adjustable portion of the mold from being forced open by the metal as it is injected into the mold chamber.

*Description in detail.*

*General frame-work, cam-shaft, drive-shaft, &c.*—The mold, assembling mechanism, cam-shaft and most of the moving parts of the machine are mounted on, attached to, or secured in an upright 1. This upright is bolted to the top of a bed-plate 2, which is supported by a pair of legs 3. At the back of the upright, held in boxes 4, is the cam-shaft 5, which carries all the cams which are necessary to produce the automatic movements which are necessary to operate the various parts of the machine. This shaft carries, in its right hand end, a pivoted clutch pawl 6, one end of which seeks engagement with a drive clutch 7, by reason of a spring 8, but which is normally held out of engagement by its other end resting on a stop-wedge 9, which is held by a swinging arm 10. The clutch 7 is carried by a shaft 11, which turns in a bracket 12 and which is kept constantly running by power applied to a pulley 13, on its outer or right hand end. On touching a starting key, the arm 10 is raised—as will be pointed out—allowing the clutch pawl to engage the clutch and to carry the shaft 5 once around, when it will be stopped by the wedge 9 disengaging the pawl.

*Type-mold, mold-moving levers, etc.*— The type mold is composed of upper cheek piece 14, to which is fastened its portion 15, of the body piece, and the lower cheek piece 16, with its portion 17, of the body piece (See especially Figs. 8, 11 and 13.)

lower cheek 16 has two guide plates 18, which are cut out so as to form grooves 19. The upper cheek has, on its left end, a plate 20 with a tongue 21, which enters the groove 19 of the left hand plate 18. On the right hand end of the upper portion of the mold is a bumper plate 22, tongued on its lower edge, to enter slot 19 of the right hand plate 18. This construction holds the front and rear faces of the mold in accurate register, while permitting a longitudinal movement of the parts on each other, to vary the width of the mold chamber 23.

At the top of the upright 1, there is a cap plate 24, which has, near its right hand end, a hinge bolt 25, which secures it to an upward projection 26 of the upright. The left end of the cap plate is held between a latch-block 27, and a portion of the upright—said latch-block being, itself, secured to the front of the upright and cut away to clear the mold plates. A raised portion 28 of the cap plate makes a snug fit for the cap plate between the latch-block and the upright and a latch pin 29 holds the cap plate in a horizontal position so that its lower edge is parallel with the upper edge of the upright—it being placed just far enough away to allow a running fit for the mold.

The lower portion of the mold is carried by a yoke 30, which slides in a groove 31, which is cut in the upper edge of the upright. The upper portion of the mold is carried by a similar yoke 32 which slides in a groove 33 which is cut in the lower edge of the cap plate. Fins 34, in the upper and lower cheek pieces, acting against the upper and lower mold yokes, while permitting of a slight lateral movement, which is necessary for clamping the mold, prevent it from being pushed forward as the type are ejected.

The lower portion of the mold is moved by a lever 35, which is pivoted to a fulcrum block 36, which block is secured to the front face of the upright—the lower end of the lever carrying a roll 37, which enters a cam slot 38 of a cam 39, near the left end of the cam shaft. Connection is made from the upper end of the lever to the mold yoke 30, by means of an adjustable link 40. This portion of the mold is accurately located by being drawn against a stop 16ᵃ, which is secured to the upright near the left end of the mold run-way and which is shown only in Fig. 8. The upper mold yoke 32, is connected by a link 41, to the upper end of a lever 42—connection being made by a screw 43, of the lever, through a slot 44, of the link. A spring 45, tends to draw the upper half of the mold to the left and to keep the right hand end of slot 44 up against the screw 43. The lever 42, has the same pivotal point as the lever 35 and it is connected by a link 46 to the upper end of cam lever 47, which lever is pivoted to the bed plate 2, and which has a roll 48, resting against a side cam 49, on the extreme left end of the cam shaft. The lever 42 is longer than the lever 35 and when the two levers are in their left hand position, it rests against a pin 50 in the lever 35. When the link 41 is at the left, up against its pin, the mold chamber is closed. It is evident that, as the lever 35, which controls the movement of the lower portion of the mold is carried to the right, that the upper portion will be moved a greater distance, by reason of its increased length of lever. The mold will, therefore, always be open far enough to allow the ejecting finger to enter, as will be pointed out. The lever 35 has an adjusting screw 51, which acts against the lever 47, to limit the maximum distance the mold may be opened.

*Matrix platen.*—The matrix platen 52 is pivoted or hinged on the front side of the upright, between the latch-block 27 and a box or keeper 53 (see Figs. 2, 6, 17, 18 and 19) by a pin 54 and has a register slide 55, which carries a lower gage piece 56, and a side flange or gage 57. The register slide has a pin 58, which rests on a stepped disk 59, in the matrix platen. This disk may be turned by a small shaft 60, which has a pointer 61, which moves over a scale 62, on the front face of the platen. By turning the pointer, the register or alining slide may be set to any desired height, as stated in the general description.

The matrix, *m*, is shown clearly in Figs. 17, 19 and 20, and consists of a block 64, which incloses or carries a portion 65, with the actual matrix character 63. The matrix block has, on its under side, a groove 66, which is adapted to be entered by a tongue 67, of the lower gage 56, when the matrix is placed in position on the platen. The side flange, 57, has a tongue 68, which is adapted to enter a groove, 69, in the left side of the matrix block. The back of the matrix block—the side toward the front of the machine—has a raised portion, 70. This is exaggerated in the drawings, as the hump is barely perceptible—just enough to permit the matrix to accurately seat itself on the face of the mold, when pressed against it by the matrix platen—the bottom and side grooves in the matrix block fitting their respective tongues loosely to permit of the matrix block turning slightly.

The ordinary way of seating a matrix is by a pointed plunger, which is adapted to enter a hole or dent in the back of the matrix. Such an arrangement, while effective, would require the shifting of the point for every different width of matrix block. Our device is adapted to receive matrices of all widths, within the capacity of the machine, and to accurately seat them on the mold, without any adjustment whatever, from one size to another.

The movement of the matrix carrier or platen is effected by means of an impression lever 71, which is pivoted to the fulcrum block 36. The lower portion of this lever is forked: one portion, 72, has a roll, 73, which bears against a cam, 74; the other portion, 75, has a roll, 76, which bears against a cam, 77. These two cams control the movement of the lever 71, which is connected to the matrix platen, yieldingly—its upper end, 78, being joined to the lever proper by means of two stiff springs, 79. The end 78, carries a roll, 80, which bears against the platen and which has a pin, 81, which is engaged by a flanged plate, 82. As the lever 71 is drawn forward the platen is pulled positively away from the mold.

From the foregoing construction it will be seen that the matrices are placed on the matrix platen very much in the same manner that cards are placed against the gage pins of an ordinary job printing press, that they are held to positive movement to and from the mold and that they are as freely removable from the platen as cards are from a job press.

It will be noticed, by reference to Fig. 19, that the register or alining slide, 55, fits loosely in the platen at its upper end; that it could be moved sidewise were it not for a block, 83, which is interposed between said slide and the latch block 27. This block is very slightly tapering and the parts are so made that, when in its rearmost position against the mold, the register slide is exactly vertical. As the mold is moved to the left the matrix platen with the matrix is advanced toward the mold. Immediately the lower portion of the mold reaches its extreme left position, against the stop 16ª the matrix is advanced up to the mold, but with no perceptible pressure, as already stated. The upper portion of the mold is then drawn over by the lever 42 and connections, until the bumper plate, 22, strikes against the matrix block which is on the platen; after which, the spring 45 yields. As the matrix has to be withdrawn before the mold is again moved to the right, it is necessary to remove the pressure which has been put against the side of the matrix, in order to get it away easily. While this might be done in various way, the wedge 83, is a simple and effective means of doing it. With the slightest movement forward of the matrix platen the matrix is free.

The upper portion of the mold being drawn to the left yieldingly, as already explained, and being limited in its movement by the matrix which is interposed in the path of the bunter plate 22, it is evident that the width of the mold chamber 23 will vary according to the width of the matrix $m$ which is placed on the matrix platen and seated on the mold. The matrix, therefore, becomes its own gage for regulating the running width or set-way size of the type which is cast. In Fig. 8, the position of a matrix on the mold is indicated by a dotted rectangle $m'$. In this view the mold chamber 23 is set to cast about a 2-em character or space. A thin character would have a narrower matrix and the bunter plate 22 would move on farther to the left before being stopped by the matrix and the mold chamber would be closed up to correspond with the character or type that was being cast.

*Mold-locking devices.*—During the time of casting, the two parts of the mold are firmly clamped together by means of a locking bolt, 84, which has a vertical sliding movement in the cap plate 24 and which bears against the upper mold yoke 32. This bolt is driven downward by a rock-shaft, 85, which is flattened off so as to act as a lever, as shown in Fig. 8—said shaft having, on its rear end, an arm, 86, which is actuated by a spring, 87. This arm is raised by the upper end of a long rod which, for convenience, is made in two pieces, 88 and 89—the upper portion, 88, being curved. The lower portion, 89, carries a cam roll, 90, and is moved by a cam, 91, on which it rests (see Fig. 4).

In order to prevent the mold being forced open by the pressure of the metal overcoming the pressure of the spring 45 and friction caused by the locking bolt 84, we provide an auxiliary end lock. In the upper edge of the connecting link 41 there are notches, 92, which are adapted to be engaged by a pawl, 93, which hangs from the lower end of a slide, 94, which is held in a keeper, 95—the keeper being attached to the left end of the cap plate, 24. A spring-seated bolt 96 having a spring 96ª, tends to carry the slide and pawl downward. Normally it is held upward, out of engagement with the ratchet teeth, by the locker rod, 88, which acts on a pin, 97, which is in the upper end of the slide. With the first downward movement of the locker rod the pawl, 93, enters one of the notches, 92, of the connecting rod—thereby preventing the upper half of the mold moving to the right until the pawl is released. The left end of the pawl hangs lower than its pivotal point to the slide 94—the action is, therefore, like that of a toggle and the pawl tends to aid the spring 45, in closing the bumper plate tightly against a matrix block.

*Jet slide.*—Just back of the mold, on the back of the upright, there is a jet-slide, 98, which is vertically movable between the upright and a side gib, 99, and which is held in by keepers, 100. This slide has a jet chamber, 101, through which the metal flows into the mold chamber. The jet-slide is given a reciprocating movement by a crank arm, 102, which is carried by a rock-shaft, 103, and to which the slide is connected by a link, 104—the shaft being rocked so as to throw the arm onto dead centers in upper and lower positions, by means of a pinion, 105, on the left end of said shaft, just outside the upright. This pinion is in mesh with a sector gear, 106, which has front and rear arms 107 and 108, with rolls 109 and 110, respectively—the forward roll being acted on by a cam 111, and the rear one by a cam, 112. These two cams control the movements of the jet-slide, through the parts just pointed out. The jet chamber is provided with side grooves, 113, as shown in Fig. 9, so that the jets, 114, are formed with ribs, 115, which insures the jets being ejected straight backward and fully out of the jet chamber.

*Melting pot and metal-injecting mechanism.*—The melting pot, 116, is carried by a casing, 117, which is held by side legs, 118, which are pivoted at the front to left and right arms, 119 and 120, which arms are secured to a rock-shaft, 121—said shaft rocking in a pair of brackets, 122, which are fastened to the upper surface of the bed plate. A pair of idle links, 123, at the rear, connect the legs of the casing to the rear ends of the supporting brackets, 122. The left arm, 119, has a handle, 124, by means of which the shaft, 121, may be rocked to put the pot in its casting position, as shown in Figs. 2 and 6, or to let it back out of the way, as shown in Fig. 7.

The snout 125 of the pot is tubular in form and has a nipple, 126, which is formed with a core, 127. There is an opening, 128, through an apron, 129, into the mold. By this construction of the nipple, it is possible to get an abrupt short turn in the metal passageway, 130, as already stated. A pump piston, 131, is attached to and operated by a pump lever, 132, which is pivoted by links, 133, to the pot. To the back of the casing is attached an L-shaped bracket, 134, which guides and supports the lower end of a pump rod, 135. A spring, 136, connects the pump lever to the L-bracket. When the pump rod is kicked off its ledge plate, 137, of the L-bracket, the spring acts to draw down the piston and force the metal through a port, 138, in a valve slide, 139; thence through passage ways 140 and 130, into the mold.

The pump rod is kicked off by a horizontally sliding rod or bar, 141, the forward end of which is held in and guided by a bracket, 142, which is attached to the front side of the pot casing. This rod is moved by one arm of a three-armed lever, 143. This lever is pivoted to a lug 144, of the upright and it is actuated by a spring, 145, when the middle arm, 146, which has a roll, 147, bearing against a cam, 148, permits it to act— provided also, that the horizontal arm, 149, which is pivoted at its front end to a vertically sliding bar, 150, and to which the safety device already referred to is attached, is free at the same time, as will be pointed out later.

Attached to the L-bracket is a pawl, 151, which is caused by a spring, 152, to seek engagement with teeth, 153, of the pump rod, 135. The pawl is held out of engagement with said teeth by a rod, 154, during the time the pump piston is acting to inject the metal. This rod is mounted in a similar manner to that of rod 141 and it is forced to the rear to free the pawl by a lever, 155, which has its fulcrum in the base flange, 156, of the upright, 2, and which has a roll, 157, bearing against a cam, 158—the upper end of the lever being in contact with the rod, 154. As soon as the pump has acted, this cam permits the spring, 152, to force the pawl, 151, into the teeth, 153, of the pump rod and thereby stop further downward movement of the pump piston, which would otherwise take place, when the pressure was removed by the shifting of the valve slide, 139.

The valve slide, 139, is operated by a cam, 159, through the following connections: cam rolls 160, 161, which are carried by a cam lever, 162, which is pivoted to a bracket, 163, which bracket is secured to the rear side of the upright; connecting rod, 164, which for convenience is made adjustable; horizontal lever, 165, which is pivoted to the top of the pot and one end of which enters the upper end of the valve slide, 139. The lower end of the connecting rod, 164, is attached or pivoted to the right pot casing leg by an idle link, 166. The rear end of the cam lever 162 is slotted and bell-mouthed and is adapted to receive a pin, 167, which is in the lower end of the connecting rod. This construction permits the pot and casing being thrown back as shown in Fig. 7 and again brought up to casting position, without having to disconnect the parts—the bell-mouthed lever picking up the pin of the connecting rod, in whatever position it may be.

In the position shown in Fig. 6, the valve 139 is open and in position for the piston to force the metal out of the pump well, 170, into the mold, as already pointed out. The valve is raised to close and in so doing the intake well port, 171, is uncovered, permitting the piston as it is raised, to draw in metal through the side openings, 172, to fill the well—the port 138 being closed at that time. When the valve is in its upward position, a second port, 173, near the top, registers with an overflow passageway 174, thereby permitting the metal which is in the nipple to recede slightly and prevents it running out into the jet chamber. It will be observed from this construction that, when the passages to the nipple are once full, that the height of metal will be maintained right up to the very outlet of the nipple, as long as there is any metal in the pot.

The pot is clamped against the mold by two side links, 175, which are pivoted to the upright and which have at their rear ends, a cross-bar 176. This cross-bar is held in place by pins, 177. which extend rearward from the casing and on which the bar is free to slide. A clamp screw, 178, which is carried by the cross-bar, acts against the casing of the pot to clamp the pot up against the machine—the apron, 129, which rests against the upright and the side gib, 99, taking the strain, giving the jet-slide just a running clearance between the apron on the back side and the upright and cap plate on the front. When the impression lever acts on the front of the matrix platen to force the mold and jet-slide backward against the apron, the mold having a very slight movement in the carrying yokes, a tight joint is made between the jet-slide and mold and between the apron and jet-slide, so that no metal can escape.

The pump rod is raised and latched up and the spring, 136 is put under tension by a pawl, 179, which is pivoted to the rear end of an arm 180. This arm is on the right hand end of a short shaft, 181, which rocks in bearings in a hanger, 182, which hanger is secured to the under side of the base plate. The shaft has on its left hand end, an arm, 183, which is connected by a link or pitman 184 to a crank pin, 185, which is in a crank disk, 186, on the left end of the cam shaft. The crank pin is positioned so that the pawl 179 is low at the time the pump rod is kicked off.

Any approved form of burner may be used—the one shown in the drawings needs no explanation. A snout-shield, 187, confines the heat to make it effective where it is most needed and protects the adjacent parts of the machine. A shield, 188, protects the cams, levers, etc., from dirt and metal dropping on them.

*Safety devices; automatic throw-off.*— If the starting-key should be touched without a matrix in place; or if the matrix should be improperly seated, the pump is rendered inoperative. This is done by locking the kick-off lever 143, which carries the vertical slide, 150, already pointed out. The upper end of this slide has a toe, 189, which is adapted to enter a slot, 190, of a stop-arm, 191, which is pivoted to the fulcrum block, 36, when said slot is in proper register with the toe. A spring, 192, normally holds the arm, 191, rearward. Extending downward from the matrix platen is an arm, 193, which is adapted to strike against a lug, 194, of the arm 191. When the matrix platen is pushed rearward with a matrix, the arm 191 swings forward so that its slot, 190, registers with the toe of the slide 150. If there were no matrix in place the platen would go in farther and an imperfect registering of the toe and slot would result and when the cam, 148, was in position to permit the spring 145 to kick off the pump rod, the slide 150 would be locked and it would be unable to trip the pump. In case of dirt between the matrix and mold the platen would be held out and an imperfect registering would result, which would, likewise, render the pump inoperative.

The upper half of the mold, being set for various sizes, has to be carried yieldingly and unless the bumper plate is snug up against the matrix block every time there will be an error in the running widths of the type cast. To prevent this we mount a small bell-crank lever, 195, in the bumper plate (see Figs. 2 and 8). When the mold is in its casting position at the left, the horizontal arm of lever 195 is in contact with a horizontal lever, 196, which is pivoted to the cap plate 24. If the bumper plate comes up against a matrix block the bell-crank lever will raise the end of lever 196. This lever has a pin, 197, which comes in contact with a pawl, 198, which is attached to the upper end of a rod, 199, which slides vertically in the latch block 27. This rod is pivoted at its lower end to the horizontal arm 200$^a$ of a three-armed lever, 200, which lever is pivoted to the upright just above the fulcrum block 36. The middle arm 200$^b$ of the lever 200 stands normally under the toe 189 which is on the top of the safety slide 150, as indicated by dotted line position in Fig. 2. When a matrix is in position and properly clamped by the bumper block, it is evident that the parts will be in the position shown in Fig. 2 and the pump will be free to act. If the bumper plate should be held back, the lever 196 would not be raised and the safety slide would remain latched up, although the toe 189 might be in proper register with its slot 190, the pump would be rendered inoperative. An arm, 201, on the shaft 103 at the left of the upright, is adapted to swing round to dotted line position 201$^a$ and will strike against the left hand arm 200$^c$ of the lever 200, and will insure its positive return to normal latched position, as indicated by dotted lines in Fig. 2.

*Type and jet-ejectors.*—An ejecting lever, 202, (see Fig. 7) is pivoted to the hanger 163. It is given a reciprocating movement by two cams, 203, 204, which act on two rolls, 205, which are carried on the lower forked end of said lever. An ejecting finger, 206, slides horizontally in a bracket, 207, which is secured on the rear side of the upright and which is adapted to enter the mold chamber, when the mold is in its right hand position, to eject the type—connection being made to the ejecting lever 202 by an arm, 208. The cams are so timed that the type is ejected and the ejecting finger positively drawn back from the mold while the mold is in the right hand position. Simultaneously with the ejecting of the type the jets are discharged from the jet chamber—the jet slide being in its lowest position at that time. This is done by a blade, 209, which slides in guides, 210; it being carried by an arm, 211, which is secured to a rock-shaft, 212, which shaft has on its right hand end, an arm, 213—said arm being connected by a link, 214, to the ejecting lever 202. The side ribs on the jet, which have been already pointed out, insures the ejecting blade 209 remaining against the narrow end of the jet, while it is being pushed out. The jets being wedge-shaped, it would be, otherwise, a difficult matter to be sure of always getting them out of the slide.

*Type-assembly mechanism.*—At the right of the matrix platen, secured to a slide, 215, which has a vertical adjustment in the front of the upright is a channeled type-way, 216. A front, inclosing bracket, 217, which also carries the space cutting chisel, secured to the upright below the slide 215, has a clamp screw, 218, by means of which the way is firmly held in any desired position—it being set so that its upper edge alines with the lower wall of the mold chamber by means of a stepped gage-block, 219, which is interposed between the slide 215 and the bracket 217. Attached to the cap plate 24, is a vertically adjustable top block, 220, which has a stepped gage, 221, by means of which it can be set so that the type have just a running clearance between the top block and the type-way. Extending to the left from the top block, is a horizontal stud or post, 222, which carries a rocking blade, 223. This blade is set so that it puts a slight friction on the type as they are ejected from the mold. Sliding in the channeled type-way and guided in a groove, 224, is a packer slide, 225, having a head, 226, which, in its left hand position, is drawn far enough to clear the type as they are ejected from the mold. The office of the packer is to carry the type to the right and to deposit them on a line blade, 227. This movement is effected by a cam, 228, through the following identified parts: roll 229; lever 230; connecting link 231; lever 232, which is pivoted to its fulcrum bracket 233; and connecting link 234, which connects the top of the lever 232 to the packer slide.

*Type-nicker and foot-planer.*—As the type are carried to the right they are driven forward slightly by a foot cam-plate, 235, which insures all the type being out the same distance from the upright. In under the top block and secured to the type-way is a nick cutter, 236, which planes a nick in the type as they are drawn over it—each tooth cutting a little deeper than the one before it. The last tooth is long and serves as a nick guide, 237. While on this guide the type pass the foot-cutter, 238, which extends forward from the upright and removes the traces where the jet was cut off, giving the type their usual two feet.

Where a single type is nicked at a time, in the manner shown, a slight bur may result—especially if the metal is soft. To overcome this, we cast the type with a slight recess, 239. This is formed by a pin, 240, in the mold (see Figs. 13–15). It projects into the mold so slight a distance that it does not interfere with the ejecting of the type. This recess is formed in line with the nick cutter and any possible bur that may be left by the cutter will come in the recess and would interfere in no way with the type when they are packed together in a line.

*Space-shortening device.*—As already stated in the general description, spaces are, or may be shortened, on their way from the mold to the galley, by cutting off their forward ends with a chisel. This chisel, 241, is attached to a vertically sliding bar, 242, which is held by a keeper plate, 243, in the bracket 217. A spring, 244, coiled round a pin, 245, in the upper end of the keeper 243, acts against a cap plate, 246, and tends normally to hold the chisel in an upward position. The lower end of the chisel post 242 is forked and carries a horizontal rock-shaft, 247—a latch or pawl, 248, being secured to said shaft and inclosed between the forks of the chisel post. A chisel driver, 249, is attached to the upper end of a rod, 250, which rod is pivoted to the front end of a cam lever, 251. The chisel lever has its fulcrum in a lug, 252, which extends rearward from the upright and it is operated by a cam, 253, which acts against a roll, 254, on the rear end of the lever. The forward end of the lever and the roll is held against the cam by a spring 255.

When the trigger latch 248 is swung forward the chisel driver will strike against it and the chisel post will be drawn down, carrying the chisel with it. The shaft 247 extends a little way to the left and has an arm, 256, two pins, 257, in which, inclose the lower end of a trigger lever, 258. This lever is pivoted to the bracket 217 and its upper end is positioned so that a type will strike against it as it is ejected from the mold. A light spring 259, holds the parts as shown in Fig. 12, so that the chisel driver is normally in operative position. When a type is ejected from the mold its front end strikes the lever 258 and pushes it forward. This withdraws the latch 248. The ejecting finger holds the type in this position long enough for the chisel driver to descend slightly, so that the driver comes in front of the latch and the latch cannot, therefore, become operative during that revolution of the machine. The packer head stops on its way to the right, with the type under the chisel; the chisel driver goes down but the chisel does not move, as just explained. When, however, a space is ejected from the mold, (it being shorter than a type) the trigger is not touched and the trigger latch remains in operative position under the chisel driver and as the packer head stops with the space under the chisel, the latter will be drawn down and the front end of the space will be cut off—the chisel acting against the edge of a cutter block, 260. In Fig. 5, a space is shown in the act of being cut off. The cutter block is on the type-way and in reality forms a part of the way. It is, therefore, adjustable up and down; but the chisel, which remains constant, is given a sufficiently long stroke to cut off a space of the maximum body size for which the machine is made.

As already stated in the general description, in order to make it possible to cut off the ends of very large size spaces, we cast the spaces with a recessed forward end. We do this by providing the space matrices, 261, with lugs or blocks, 262, as shown in Figs. 21 and 22. This produces a recess, 263, in the spaces 264, as shown in Figs. 23 and 24. This box-like portion is cut off on the line R—R of Fig. 24, leaving, after the foot-groove and nick has been made, the finished space, 265.

When it is desired to cast all shoulder-high spaces, the lever 258 may be blocked out in any convenient manner or a weight may be hung on the forward end of the lever 251, sufficiently heavy to overcome the force of spring 244.

*Galley.*—Secured to the right hand side of the upright is an angular bracket, 266, which is held by a clamping screw, 267—said bracket having a tongue which has a sliding fit in a groove, 268, in the upright and it is capable of a slight vertical adjustment. Mounted on this bracket is a cylindrical bar, 269, to which is pivoted the line blade 227, by two short arms, 270—one at each end. On top of this bar there is a plate, 271, having left and right side pieces, 272, which serve as a short galley—the galley proper, 273, lining up with this plate and the side pieces and being supported at its rear end by a cross-bar, 274, which is carried by a bracket, 275, which extends upward from the bedplate and right hand leg. The line blade carries a friction slide, 276, against which the line of type is pushed by the packer. A completed line of type is pushed to the right by hand until the friction slide, 276, strikes against a pin, 277, in the line blade. In this position the blade may be rocked to bring the line of type on their feet, upright, in the galley—the right hand end of the line, being in line with the edge of the galley. The lines are pushed backward down into the galley against a piece of furniture or weight, 278—leads being interposed between the lines when they are not quadded out to substantially uniform length.

*Starting-key and automatic starting device.*—The starting key, 279, which is located close to the matrix platen is on the upper end of a long tubular stem, 280, which is guided near the top through a stud, 281, which extends forward from the type-way. The lower end of the stem is pivoted to an arm, 282, which is on the left end of a shaft, 283, which shaft is mounted in suitable boxes, 284, on the under side of the bedplate and which has on its right hand end a lever, 285. The rear end of the lever 285 is joined by a connecting link, 286 to the stop-wedge arm 10. It is evident that on touching the starting key the stop-wedge will be released and that the cam shaft will be given one revolution—the wedge falling in time to intercept the clutch pawl. This is the ordinary use of the machine.

The matrices are held in compartments, 287, of the matrix tray, 288 which is mounted as shown only in Figs. 1 and 2, on the outer end of a swinging bracket arm 289—said arm being hinged by a pin, 290 to lugs, 291 of the latch block 27. As a matrix is placed on the matrix platen by the right hand the fingers of that hand are in position to depress the starting key.

As already stated, the type are cast and the matrix platen returned to its forward position, when the shaft is stopped; but the mold is not unclamped. This gives ample time for large sizes of type to cool before the type is discharged from the mold, which is done with the first part of the next revolution of the cam shaft, after the next matrix is inserted and the shaft started.

When it is desirable to cast a large number of one character, as in casting up a font for the case, an automatic starting device is brought into action. This consists of a long lever 292, which is pivoted by links, 293, to a block, 294, which is secured to the under side of the bed plate. This lever is raised to the position shown in Fig. 2 by a cam 295, which acts against a roll, 296, which is in the upper end of a plunger, 297—the plunger being pivoted at its lower end to the short end of the lever 292 and being held in a tubular guide, 298, which is secured in the bed plate. Just as the cam shaft completes its revolution the long right hand end of the lever 292, which acts as a weight, is permitted to drop. Near the right hand end there is a pin 299, which enters a slot, 300, in a depending link, 301—said link being pivoted at its upper end to the forward end of the lever 285. When the pin reaches the bottom of the slot the shaft 283 will be rocked the same as though the starting key were struck and the cam shaft will be set in motion. The right hand end of the lever 292 is connected by a piston rod 302, to a dash-pot 304 (Fig. 3), which may be of any approved construction that is capable of adjustment to vary the time of the lever 292 in falling. A matrix is placed on the platen and the machine started. After the first type is cast the cam shaft is stopped long enough to allow it to solidify thoroughly in the mold—the dash-pot lever being timed to reach the bottom of its stroke and to start the shaft off again at that time.

We are aware that devices for delaying the time and varying the period for cooling are, in themselves, broadly old—having been used for many years in some of the type foundries. Our improvement consists in the manner of applying the principle, which depends on absolute time and cannot be varied by changing the speed at which the machine is driven.

For ordinary uses of the machine in casting and composing the lever 292 is locked up in the position shown in Fig. 2, by a pin 303 in the plunger 277, in which position the starting device is rendered inoperative.

When the type cast are small and no extra time is necessary, a weight may be hung on the starting key arm 282—thus permitting the cam shaft to run continuously—the machine being stopped only when it is necessary to change a matrix, and then only for an instant.

What we claim is:

1. In a machine of the class described, the combination of a type mold and casting mechanism, of a matrix carrier, adapted to receive a hand-placed matrix; automatic means for moving the matrix carrier and matrix up to the mold, casting a type and returning the carrier with its matrix to starting position; a starting key adapted to call said automatic means into action and a stop device adapted to stop the action of said automatic means when one complete cycle of operations necessary to cast a type has been completed.

2. In a machine of the class described, a type mold and casting mechanism in combination with a reciprocating matrix platen which stands normally away from said mold—said matrix platen being adapted to receive a hand-placed matrix; a power shaft and connections therefrom adapted to move said platen so as to clamp its matrix against said mold, cast a type and return with it to starting position; a starting key and connections therefrom for tripping said shaft and a stop device for stopping said shaft when it has made one revolution, whereby matrices may be rapidly fed into the machine and type cast in any desired order with a practically or substantially continuous operation.

3. In a machine of the class described, the combination of a type mold and casting mechanism with a matrix carrier—said matrix carrier being provided with a ledge which is adapted to receive a hand-placed matrix; means for moving said carrier to and from said mold—said matrix being clamped tightly between said carrier and said mold when said casting mechanism is operating but being entirely free for removal when said carrier is away from the mold.

4. In a machine of the class described, the combination of the following elements, to-wit: a type mold; a matrix, a reciprocating matrix carrier adapted to receive said matrix and to move to and from said mold with the same—said matrix being held on an adjustable alining slide; a stepped piece, adapted to vary the position of said slide on said carrier and a scale for indicating the position of said alining slide on said carrier.

5. In a machine of the class described, the combination of the following elements, to-wit: a type mold; a matrix; a reciprocating matrix carrier, adapted to receive said matrix and to move with it to and from said mold—said matrix being held on an adjustable alining slide; means interposed between said slide and said carrier to vary the position of said slide on said carrier and a scale for exhibiting to the eye the adjustment of said alining slide on said matrix carrier.

6. In a machine of the class described, the combination of the following elements, to-wit: a type mold comprising two similar obverse portions or halves, adapted to reciprocate in a mold runway between a casting and a discharging position—one part being adjustable on the other to vary the mold opening—said adjustable part carrying a bumper plate which is adapted to strike against a matrix when said matrix is seated on said mold; means for moving one portion of said mold positively; a mold stop, against which said portion of said mold is brought when in casting position; a matrix and means for seating it on said mold; yielding means for bringing the adjustable portion of the mold against said matrix to limit the mold opening; means for clamping the mold parts together and means for casting a type in said mold when so adjusted.

7. In a machine of the class described, a type mold having a relatively fixed portion and a portion adjustable on said fixed portion to vary the mold opening—said adjustable portion being adapted to strike against a matrix when said matrix is seated on said mold; means for seating a matrix on said mold; yielding means for forcing said adjustable mold portion against said matrix; an abutment, independent of said mold, against which said matrix is forced by said adjustable mold portion and means for releasing the pressure against said matrix before said matrix is withdrawn from the path of said adjustable portion of the mold.

8. In a machine of the class described, the combination of the following elements, to-wit: a type mold—one portion of which is adjustable to vary the mold opening; a matrix and means for seating said matrix on said mold; means for forcing the adjustable portion of said mold against said matrix to set the mold opening; and a wedge adapted to receive and withstand the force of the adjusting movement—whereby the matrix may be freely withdrawn from said mold.

9. In a machine of the class described, the combination of the following elements, to-wit: a type mold; a matrix carrier adapted to receive a matrix and to move with it to said mold—said matrix being held on an alining slide in said carrier and said slide being slightly loose, sidewise, in its seat on said carrier; a wedge adapted to strike against said slide when the matrix carrier has seated its matrix on the mold, to take up the lost motion of said slide on said carrier; means for bringing side pressure against the matrix to clamp it and the slide against said wedge to adjust said mold to proper character size—whereby said matrix is freed immediately it is withdrawn from said mold.

10. In a machine of the class described, the combination of a type mold with a matrix and means for seating said matrix on said mold—said matrix being used as a gage for the set-way size of the mold chamber; means for clamping said matrix to adjust said mold to proper size for the matrix character and means for rendering said matrix free to be withdrawn from said mold without disturbing the clamping means.

11. In a machine of the class described, the combination of a type mold with a matrix and a matrix carrier which is adapted to receive said matrix and to seat it on the mold—said matrix being provided on its reverse or back side with a hump which is substantially central with the matrix character and against which the clamping surface of said carrier acts to seat said matrix on said mold—whereby the matrix is accurately seated.

12. In a machine of the class described, the combination of a type mold with a matrix and a matrix carrier adapted to receive said matrix and to clamp it against said mold—the clamping surface of said carrier when in clamped position being a plane which is substantially parallel to the face of the mold—said matrix being provided with a hump on its reverse side which is substantially central with the matrix character of the matrix and against which the clamping surface of said carrier acts to seat said matrix on said mold—whereby said carrier is adapted to accurately seat matrices of varying widths on said mold without adjustment.

13. In a machine of the class described, the combination of a type mold having one part adjustable to set the mold opening for the proper set-way size, with a type matrix adapted to be used as a gage for adjusting said mold to its proper set-way size; means for clamping said matrix in order to set said mold therefrom; a casting mechanism and means for rendering said mechanism inoperative when said mold is imperfectly or improperly adjusted.

14. In a machine of the class described, the combination of the following elements, to-wit: a type mold, adjustable for various sizes of type set-way; a matrix which is adapted to be used as a gage to set said mold to proper set-way size; a casting mechanism which is operated by a pump which is normally held latched up under spring tension; a kick-off device which tends normally to release said pump at the proper time to inject metal to cast a type and a safety device for rendering said kick-off inoperative provided said mold is improperly set.

15. In a machine of the class described, the combination of the following elements, to-wit: a type mold having one part adjustable to vary the width of the mold chamber to cast type of varying set-way sizes; a matrix which is adapted to be used as a gage to adjust said mold to proper set-way size—said adjustable part of said mold being drawn against said matrix yieldingly; means for clamping said adjustable mold part frictionally and an auxiliary clamp for positively locking said adjustable mold part.

16. In a machine of the class described, the combination of a type mold which is adapted to reciprocate between a casting and an ejecting position—said mold being provided with a jet slide which forms one wall of the mold chamber and in which slide the jet is formed; with means for moving said jet slide independent of and in advance of the reciprocating mold movement and a dual ejecting device for simultaneously ejecting the type from the mold and the jet from the jet slide.

17. In a machine of the class described, the combination of the following elements, to-wit: a type mold and casting mechanism—the metal being injected into said mold through an independent jet slide which forms one wall of the mold chamber; independent means for moving said jet slide from casting position to an ejecting position; an independent jet-ejecting finger, with which the jet-forming chamber registers when in the ejecting position and means for operating said slide to eject the jet from said jet slide.

18. In a machine of the class described, a jet slide having a jet chamber; a jet-ejecting finger for ejecting a jet from said chamber, in combination with means for holding said ejecting finger against said jet until fully ejected from said jet chamber.

19. In a machine of the class described, a jet-forming chamber having walls integral with the piece in which it is formed—said jet chamber being wedge-shaped, in combination with an ejecting finger which is adapted to enter said jet chamber at the narrow end to eject the jet and means for holding said ejecting finger against the narrow end of the jet until fully ejected from said chamber.

20. In a machine of the class described, a jet chamber wedge-shaped in form, said chamber being formed with side grooves—whereby a jet formed in said chamber must move in a direction parallel with the axis of the wedge in being removed from said chamber.

21. In a machine of the class described, the combination of a type mold comprising two similar obverse portions or halves, adapted to reciprocate in a mold runway between a casting position and an ejecting position; with an ejecting finger which is adapted to enter the mold chamber when said mold is in its ejecting position and means for giving one of said mold portions a movement in excess of the other to secure a sufficiently large opening through the mold for said ejecting finger.

22. In a machine of the class described, the combination of the following elements, to-wit: a type mold and casting mechanism; means for casting type and shoulder-high spaces therein; a type runway onto which said spaces are delivered; a space-shortening chisel located along the runway and adapted to cut off the end of a type or space; means for moving the type and spaces along the runway and stopping with said type and spaces in position for said chisel to act on them; means for causing said chisel to act when a space is in proper position to be cut off and for rendering said chisel inoperative when a type is on the runway.

23. In a machine of the class described, the combination of the following elements, to-wit: a type runway; means for moving type and spaces along said runway; a space-shortening chisel located along the runway and adapted to cut off type and spaces; a chisel which tends normally to operate when either a type or space is in operative position; a trigger device which is set when the type and spaces are delivered on said runway, for rendering said chisel inoperative when a type is on the runway but which permits the chisel to act when a space is in operative position on the runway.

24. In a machine of the class described, means for casting shoulder-high spaces with a recessed end, in combination with means for removing said recessed end to shorten said space.

25. In a machine of the class described, the combination of a type mold adapted to cast shoulder-high spaces with a space matrix having a projecting lug which is adapted to enter the mold chamber to produce a recessed end on said shoulder-high space.

26. In a machine of the class described, a type mold; a space matrix having a projecting lug which is in cross section less than the cross-section of the mold-chamber—whereby said lug is adapted to enter the mold chamber without touching the side walls thereof; means for seating said matrix on said mold with the lug in the mold chamber; in combination with means for casting a space in said mold—said space being formed with a recess in its end, for the purpose set forth.

27. In a type casting machine, means for casting a type or space with a recess in its side, in combination with means for cutting a nick in said type—said nick terminating in said side recess.

28. In a machine of the class described, the combination of the following elements, to-wit: a type mold and casting mechanism; a matrix; a matrix carrier which is adapted to receive said matrix and seat it on the mold—holding it there until a type is cast and then returning with it to starting position; a cam shaft having operative connections therefrom to the various moving parts of the machine—one revolution of said shaft producing all the movements which are necessary to perform the complete cycle of operations which are necessary to cast a type and eject the same from the mold and deliver the same into a line; a constantly running shaft; a clutch which is adapted to cause the cam shaft to move with the running shaft; means for calling said cam shaft into action; means for stopping said cam shaft when it has made one revolution—the stopped position of said cam shaft being in the midst of the cycle of operations to cast and eject a type and at a point where the type is left in the mold and the matrix and matrix carrier withdrawn from said mold.

In testimony whereof we affix our signatures in presence of two witnesses.

JOHN S. BRAND.
F. AMOS JOHNSON.

Witnesses:
M. C. CRANE,
T. O. MACKINNON.